March 1, 1938.  A. VON WANGENHEIM  2,110,100
GRAVITY FEED CONTROL
Filed Nov. 23, 1934
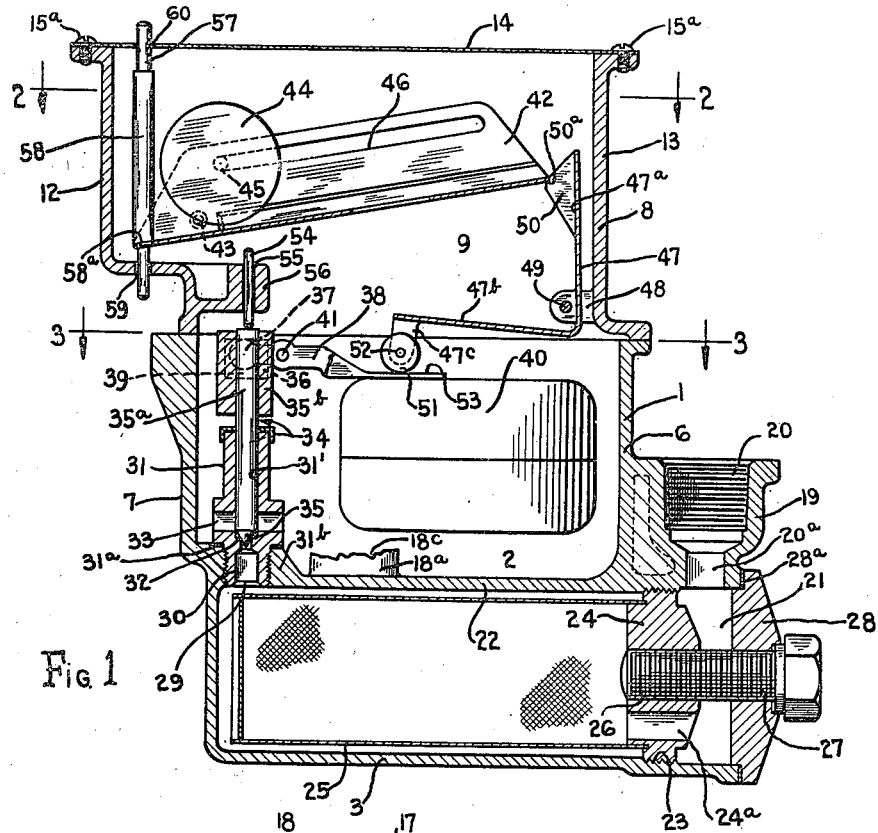
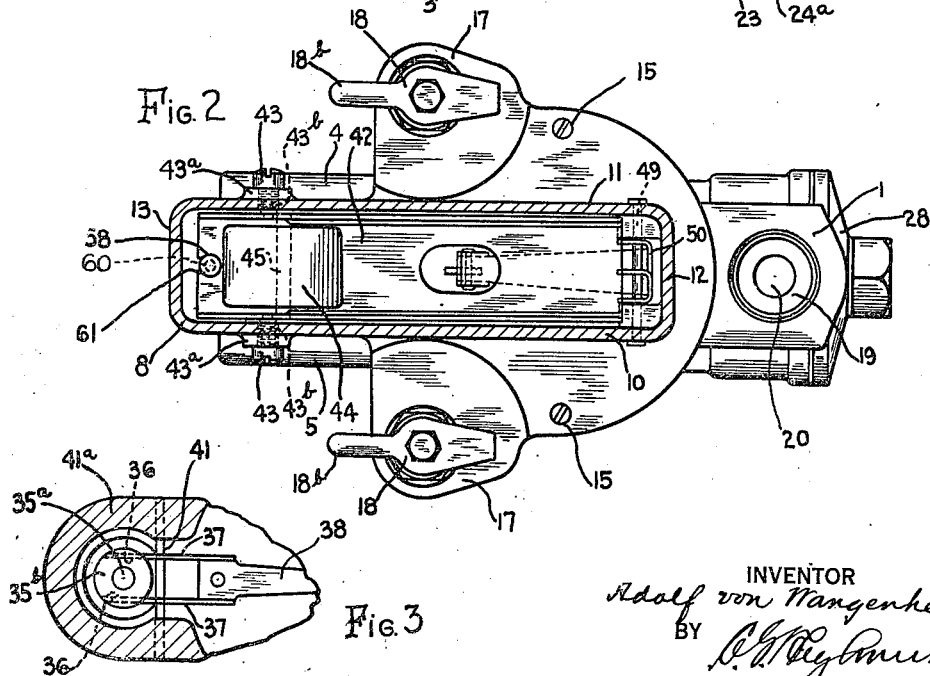
INVENTOR
Adolf von Wangenheim
BY
ATTORNEY Patented Mar. 1, 1938

2,110,100

UNITED STATES PATENT OFFICE 2,110,100

GRAVITY FEED CONTROL

Adolf von Wangenheim, Detroit, Mich., assignor to Detroit Lubricator Company, Detroit, Mich., a corporation of Michigan Application November 23, 1934, Serial No. 754,521

17 Claims. (Cl. 137—68)

This invention relates to new and useful improvements in control means and more particularly to means for controlling the flow of liquids.

An object of my invention is to provide means to maintain a substantially constant level of supplied liquid at a point of delivery.

Another object of the invention is to provide means to stop the delivery of liquid upon increase of the liquid level above the desired constant level.

Another object of the invention is to obviate the disadvantages incurred by differences in head pressures resulting from variations in the liquid level in a source of supply such as the tank of an oil burning system.

The invention consists in the improved construction and in the combination and arrangement of parts to be more fully described hereinafter, the novelty of which will be particularly pointed out and distinctly claimed.

Figure 1 is a vertical sectional view of a device embodying the invention.

Figure 2 is a horizontal sectional view taken on line 2—2 of Figure 1.

Figure 3 is an enlarged fragmentary sectional view taken on line 3—3 of Figure 1.

Referring now to the drawing by characters of reference, I designates a hollow casing enclosing a chamber 2, having a bottom wall 3, from which rises side walls 4 and 5, and end walls 6 and 7. A second casing 8, containing the chamber 9, and comprising the side walls 10 and 11, and walls 12 and 13 and cover plate 14, is superimposed on the casing I and held thereto by means of screws 15. In certain applications of the invention it might be desirable to form the casings I and 8 integrally, all of which is within the contemplation of the invention. The cover plate 14 is secured to the casing 8 by means of screws 15a. It will be noted that chambers 2 and 9 communicate with each other at all times.

The casing I is provided with one or more lateral extensions 17, in which are mounted by any suitable means, conventional metering valves 18, having valve casings 18a, and adjusting handles 18b. The valves 18 control separate outlet ports, as at 18c (Figure 1) in the chamber 2, and communicate with fuel consumption devices such as oil burners (not shown). In certain applications one valve instead of two may be used. Another extension numbered 19 is formed integral with the end wall 6 of the casing I and comprises a threaded inlet 20, adapted to receive a supply conduit (not shown) from a tank or other receptacle. The threaded inlet 20 communicates with a reduced opening 20a, which in turn communicates with a sump chamber 21 which comprises a compartment formed between the bottom wall 3 of the casing I and a partition 22, which is disposed transversely between the end walls 6 and 7 of the casing I. Threaded into the walls of the sump chamber 21, as at 23, is a member 24, to which is secured by any suitable means, the screen 25, which is intended to prevent dirt and particles of foreign substances from being carried into the chamber 2. Screen 25 is so mounted as to be readily removable for cleaning or replacement. The member 24 is provided with one or more ports 24a, and is internally threaded as at 26, in order to engage the bolt 27 which serves as a tie rod to hold the cover plate 28 in position as shown in Figure 1. A gasket 28a is positioned between the cover plate 28 and the housing I to insure against leakage.

The sump chamber 21 has an outlet 29, which opens into the bore or inlet 30 of a sleeve or tubular member 31, which is vertically mounted, and sealed by a gasket 31a, in a threaded offset 31b formed on the partition wall 22. The member 31 has formed, adjacent the top plane of the offset 31b, an internal annular shoulder, defining an upwardly facing valve seat 32. Above the valve seat 32, the member 31 is provided with one or more ports 33, which ports are arranged to communicate with the chamber 2, and the bore 30, through the valve seat 32. A valve member 34 is vertically mounted for reciprocation in the bore 31 of the member 31 and is preferably formed with a conical valve head 35 which cooperates with the valve seat 32 to close the bore or inlet 30.

The valve stem 35a of the valve member 34, extends through the sleeve member 31 and is provided with a collar 35b, which is press fitted on to the stem 35a, and adds weight to the valve 34 and tends to force it downwardly. The collar 35b is provided near its upper end with oppositely disposed transverse slots 36 (see Figure 3), adapted to receive the bifurcated arms 37 of the lever 38. The slots 36 are preferably of greater height or width, as indicated at 39, than the height of arms 37 to permit a limited movement of the said bifurcated arms 37 in a vertical direction. The lever 38 carries at its opposite end a float 40, and is fulcrumed on a pin 41, which is secured in the side walls of casing I and in an extension 41a, projecting from and forming part of wall 7 (Figure 3).

Positioned in the chamber 9 is an auxiliary valve actuator including tilting member 42 which is substantially U-shaped in cross section and which is pivoted, near one end, on stud bolts 43 which extend through offsets 43a and openings 43b, formed in the side walls 10 and 11 of the casing 8. A cylinder 44, comprising a shiftable weight, is supported on a guiding pin 45, the ends of which are arranged to travel in longitudinal slots 46 formed in the side walls of the tilting member 42. A bell crank lever or trigger 47, having a vertical arm 47a, a horizontal arm 47b and depending arms 47c, is rockingly mounted on a pin 49 which extends through the side walls 10 and 11 of the casing 8. The vertical arm 47a of the lever 47, has a plurality of inturned triangular-shaped tabs 50 formed near its upper end, which serve as supports for the free end of the tilting member 42, when the latter is in the position of rest as illustrated in Figure 1. The tabs 50 are provided with notches 50a, which engage with the free end of the member 42, to lock the same in elevated position. The tabs 50 are held against release, by vibration, by the weight of the horizontal arm 47b, when the latter is not being actuated by the float 40. The angular faces of the tabs 50 serve as cams to rock the bell crank or trigger 47 out of position, as the member 42 is moved in a manner to be hereinafter described into its elevated inactive position from an active position. A roller 51 is mounted on a pin 52, which extends through the depending arms 47c of the lever 47, and provides a rolling and substantially frictionless contact with the upper surface 53 of the float carrying lever 38. The surface 53 of the lever 38 serves as a track for said roller 51 and prevents the roller from wearing or damaging the extremely light material of which the float 40 is made.

A striking pin 54 is vertically and reciprocally mounted in a bore 55 which passes through an inwardly disposed extension member 56, formed on the wall 12 of the casing 8, and rests end to end on the valve stem 35a. The pin 54 is of such length as to permit it to project above the extension member 56, yet assures a clearance between it and the tilting member 42, when the latter is in the inactive position as shown in Figure 1.

A reset member such as a pin 57, having an offset portion 58 formed intermediate its ends, is reciprocally mounted in holes 59 and 60, formed respectively in the bottom wall of the casing 8 and the cover plate 14. The lower end of the reset pin 57 registers with a slot 61 (Figure 2) formed in the end of the tilting member 42, so that the lower offset shoulder 58a of the reset pin 57 at all times bears against the floor of the tilting member 42. The reset pin 57 serves as a means to reset the tilting member 42 and return it to the inactive position as illustrated in Figure 1, after the said member has been brought into use as hereinafter described.

In operation the device works as follows: The liquid enters the inlet 20 and passes through the sump chamber 21, the port 24a, the strainer 25 and thence through inlet 30, the valve seat 32 and the ports 33 into the chamber 2. As the liquid enters the chamber 2 the float 40 will rise with the liquid level in the chamber, actuating the lever 38 and allowing the valve 35 to move downwardly under the weight of the collar 35b, until the valve is firmly seated on the valve seat 32, thereby preventing the entrance of more liquid. The inlet 30 will remain closed until such time as the liquid level falls below the predetermined point, at which instant the valve member 35 will again be actuated, but this time in the opposite direction, allowing the valve seat 32 to be uncovered and more liquid to be admitted through the inlet 30. The valve seat 32 will remain uncovered until such time as the liquid level again reaches the predetermined desired level. For all normal changes in liquid level in chamber 2, the float 40 will cause the valve 35 to be actuated so as to open and close the inlet 30 and thus regulate and control the inflow of liquid to the chamber 2. If for any reason, however, the valve 35 should fail to close the inlet 30, when the liquid level in chamber 2 reaches its desired normal maximum level, then the safety means carried in chamber 9 will be actuated by the float 40 to seat the valve 35, and thus positively stop the admission of liquid to the chamber 2. The safety means referred to operates as follows: As the float 40 is immersed in the rising liquid, its buoyancy increases and when the float reaches the point where its buoyancy exceeds the balance of weight of the member 42 and cylinder 44, the lever 47 is rocked, causing the member 42 to slip off the tabs 50. The balance being destroyed, the member 42 tilts downwardly, causing the cylinder 44 to roll down with such force as to cause the bottom of the member 42 to impact sharply against the striking pin 54, which in turn strikes the valve stem 35a with force sufficient to positively seat the valve 35 and hold the same on the valve seat 32 to close the inlet 30 against the admission of more liquid. As the member 42 is tilted the reset pin 57 is moved upwardly. The valve seat 32 will remain closed until the tilting member 42 is returned to its inactive position as shown in Figure 1. To reset the tilting member 42, it is simply necessary to exert downward pressure on the reset pin 57. As the reset pin 57 moves downwardly, the shoulder 58a rides against the floor of the member 42, causing the opposite end of the member 42 to be elevated, thereby permitting the cylinder 44 to roll to the opposite end of the member 42 and at the same time causing the tabs 50 of the lever 47 to take their normal position under the elevating end of the tilting member 42. When the elements have resumed their position, as shown in Figure 1, the valve 35 may again function normally to control the inflow of liquid to the chamber 2.

It will thus be seen that I have provided a simple and inexpensive device having valve means operable by changes in the liquid level, in a float chamber to control the inflow of liquid, and safety means to positively prevent the flow of liquid upon failure of the float control valve means to function normally.

Having described my invention, what I claim and desire to secure by Letters Patent, is:

1. In a liquid level control device having a chamber in which the level of the liquid is normally maintained substantially constant by a float actuated valve cooperating with a valve port, a valve actuating means operable for actuating said valve to positively close said port when the level of the liquid in said chamber rises to a predetermined level above said substantially constant level comprising, a supporting means, a tiltable member supported thereby, said tiltable member normally being at rest and positioned to be actuated by the float upon liquid level increase to said predetermined level, said tiltable member being disposed in one position when the liquid level is maintained substantially constant and being movable to a second position upon increase in liquid level to said predetermined level, and a weight loosely carried by said tiltable member and shiftable relative thereto when said tiltable member is tilted to said second position, said weight being normally disposed in inactive position and having a potential force operable when released by tilting of said tiltable member to its second position to actuate said valve.

2. In a liquid level control device having a chamber in which the level of the liquid is normally maintained substantially constant by a float actuated valve cooperating with a valve port, a normally inactive valve actuating means comprising, a loosely disposed weight having an inactive and an active position and being operable when moved to its active position to actuate said valve to positively close said port, a tiltable member on which said weight is shiftably supported and along which it is shifted from its inactive to its active position when the said tiltable member is tilted to one position, said tiltable member being actuated by the float and normally being disconnected therefrom, said tiltable member normally supporting said weight in its inactive position and being tiltable to said one position upon increase in liquid level to a predetermined level.

3. An actuator for positively closing a port in a liquid level chamber in which the level of the liquid is normally maintained substantially constant by a float actuated valve comprising, a normally inactive weight having a potential force operable to move when released to an active position to actuate said valve to close said port, a pivotal member on which said weight is shiftably supported and which normally supports said weight in inactive position, said weight being shiftable along said pivotal member to its active position upon pivotal movement of said pivotal member in one direction, and a trigger member normally supporting said pivotal member with said weight in said inactive position, said trigger member being actuated by the float to release said pivotal member upon a predetermined increase in liquid level above said substantially constant level and normally being disengaged from said float.

4. In a liquid level control device, an auxiliary actuator for positively closing a valve port upon failure of a float actuated valve to close said port when the liquid level rises to a predetermined level comprising, a tiltable member having a normally inactive position and being tiltable to a second position, a roller weight member on said tiltable member and having a potential force operable when released to actuate said valve and positively close said port, said roller weight member being normally disposed in an inactive position by said tiltable member and movable therealong to an active position upon tilting of said tiltable member to said second position, and a trigger member normally holding said tiltable member in said inactive position, said trigger member being actuated by the float to release said tiltable member upon increase in liquid level to said predetermined level.

5. In a liquid level control device, an auxiliary actuator for positively closing a valve port upon failure of a float actuated valve to close the port when the level of the liquid rises to a predetermined level comprising, a casing, a tiltable member supported therein having a normally inactive position and being tiltable to a second position, a weight member within said casing and supported on said tiltable member, said weight member being shiftable along said tiltable member when said tiltable member is tilted, said weight member having a potential force operable when said weight member is shifted by movement of said tiltable member to said second position to move the valve and positively close the port, a trigger member normally holding said tiltable member in said inactive position, said trigger member being actuated by the float to release said tiltable member upon rise in liquid level to said predetermined level, and manual means accessible externally of said casing for tilting said tiltable member to said inactive position.

6. In a liquid level control device, an auxiliary actuator for positively closing a valve port upon failure of a float actuated valve to close the port when the liquid level rises to a predetermined level comprising, a supporting means, a tiltable member supported thereby, said tiltable member being tiltable each side of a horizontal plane and normally having an inclined inactive position, said tiltable member being movable through said plane to an active position, a roller weight member loosely supported on said tiltable member, said roller weight member normally being supported in an inactive position on said tiltable member and arranged to roll down said tiltable member and exert its potential force to move the valve and positively close the port when said tiltable member is tilted to its active position, a trigger member normally holding said tiltable member in said inactive inclined position, said trigger member being actuated by the float to release said tiltable member upon increase in liquid level to said predetermined level.

7. In a liquid level control device, an auxiliary actuator for positively closing a valve port upon failure of a float actuated valve to close the port when the liquid level rises to a predetermined level comprising, a supporting means, a tiltable member supported thereby, said tiltable member being tiltable each side of a horizontal plane and normally having an inclined inactive position, said tiltable member being movable through said plane to an active position, a roller weight member relatively movably supported on said tiltable member, said roller weight member normally being supported in an inactive position on said tiltable member and arranged to roll down said tiltable member and exert its potential force to move the valve and positively close the port when said tiltable member is tilted to its active position, a trigger member normally holding said tiltable member in said inactive inclined position, said trigger member being actuated by the float to release said tiltable member upon increase in liquid level to said predetermined level, and means for tilting said tiltable member to return the same and the roller member to their inactive positions.

8. In a liquid level control device, an auxiliary actuator, a casing having a valve port, a float, a valve actuated by said float to close said port when the liquid level rises to a predetermined level comprising, a supporting means, a pivotal member disposed above said valve in an inclined plane and having guideways, said pivotal member being normally disposed in spaced relation to said valve and adapted to pivot downward and engage said valve, a roller weight member supported on said pivotal member and guided in its movement by said guideways, said roller weight member normally being disposed in an inactive position by said inclined pivotal member and movable down said pivotal member by gravity upon inclination of the pivotal member to another position, said roller weight member exerting a force on movement upon inclination of said pivotal member to said last-named position to positively hold said valve in closed position, a pivotal trigger member normally holding said pivotal member in said first-named inclined position, said pivotal trigger member being actuated by said float to release said pivotal member upon rise in liquid level to said predetermined level.

9. An auxiliary actuator for actuating a control means upon abnormal operation of the normal actuating means comprising, a loosely disposed shiftable weight operable when shifted to one position to actuate said control means and normally disposed in an inactive position, a tiltable member by which said weight is carried and along which it is shifted to said one position upon downward movement of said tiltable member, and a trigger member normally holding said tiltable member in an inactive position, said trigger member being actuated by the normal actuating means upon abnormal operation of the normal actuating means to release said tiltable member.

10. An actuator for positively closing a port in a liquid level chamber in which the level of the liquid is normally maintained substantially constant by a float actuated valve comprising, an inclined supporting member, a weight carried by said inclined supporting member and having an inactive and an active position, said weight being normally disposed in said inactive position and being movable down said inclined member to said active position to exert its potential force to positively close the valve port upon increase in liquid level to a predetermined level, and a trigger member normally holding said weight in said inactive position, said trigger member being actuated by said float to release said weight to actuate said valve when the liquid level increases to said predetermined level.

11. An actuator for positively closing a port in a liquid level chamber in which the level of the liquid is normally maintained substantially constant by a float actuated valve comprising, a pivotal supporting lever normally disposed in one position and movable to an inclined position, a normally inactive weight member carried by said pivotal supporting lever and operable to pivot said lever and move therealong to an active position to actuate said valve when the level of the liquid increases to a predetermined level, said weight member having a potential force operable when the weight member is moved to its active position to positively close said valve port, and a trigger member normally holding said lever in said one position and actuated by the float for movement to said inclined position when the level of the liquid increases to said predetermined level.

12. An auxiliary actuator for actuating a control means upon abnormal operation of the normal actuating means comprising, a movable member having an active position and an inactive position, said movable member being normally disposed in its inactive position and arranged to descend by gravity and by its weight to actuate the control means, and a trigger member normally engaging and holding said movable member in its inactive position, said trigger member being actuated by the normal actuating means upon abnormal operation of the normal actuating means to actuate said control means whereby to move out of engagement with said movable member to actuate said control means, said trigger member being arranged so that it is normally out of engagement with the normal actuating means.

13. An auxiliary actuator for actuating a control means upon abnormal operation of the normal actuating means comprising a casing, a movable member in said casing, said movable member having an active and an inactive position, said movable member being normally disposed in its inactive position and arranged to descend by gravity and by its weight to actuate the control means, a trigger member normally holding said movable member in its inactive position, said trigger member being actuated by the normal actuating means upon abnormal operation of the same in actuating said control means whereby to release said movable member to actuate said control means, and manually operable means externally of said casing for positioning said movable member and said trigger member in holding relation.

14. An auxiliary actuator for actuating a control means upon abnormal operation of the normal actuating means comprising, a movable member having an active position and an inactive position, said movable member being normally disposed in its inactive position and operable when moved to its active position to actuate the control means, a trigger member normally holding said movable member in its inactive position, said trigger member being actuated by the normal actuating means upon abnormal operation of the same in actuating said control means whereby to release said movable member to actuate said control means, and a roller member carried by said trigger member for engagement with the normal actuating means to reduce frictional engagement therebetween.

15. In a liquid level control device, a main casing for liquid and having a port for flow of said liquid, main actuating means in said casing for controlling said port and operable to close said port, said main actuating means being responsive to changes in liquid level in said casing to maintain the level of the liquid at a predetermined substantially constant level, a second casing removably mounted on said main casing, auxiliary actuating means disposed within and carried by said second-named casing as a unitary structure, said auxiliary actuating means being operable to close said port upon rise of the liquid above the level at which said main actuating means normally closes said port, and means operable in response to a predetermined increase in the level of the liquid above said constant level for actuating said auxiliary actuating means.

16. In a liquid level control device, a main casing for liquid and having a port for flow of said liquid, main actuating means in said casing for controlling said port, said main actuating means being responsive to changes in liquid level in said casing to maintain the level of the liquid at a predetermined substantially constant level, a second casing removably mounted on said main casing, auxiliary actuating means disposed within and carried by said second-named casing as a unitary structure, said auxiliary actuating means being operable to close said port and actuated by said main actuating means upon a predetermined increase in liquid level above said predetermined level.

17. In a liquid level control device, a main casing for liquid and having a port for flow of said liquid, a valve member controlling said port, a float in said casing operatively connected to said valve member to control operation thereof, a second casing removably mounted on said main casing and overlying said valve member, auxiliary actuating means carried by and within said second named casing and removable therewith as a unitary structure, said auxiliary actuating means being operable to move said valve member to close said port, and means operable by said float on predetermined movement of said float in a valve closing direction to actuate said auxiliary actuating means.

ADOLF von WANGENHEIM.